(12) United States Patent
Ichikawa et al.

(10) Patent No.: US 8,936,520 B2
(45) Date of Patent: *Jan. 20, 2015

(54) MULTILAYER GOLF BALL WITH RESIN INNER CORE AND SPECIFIED HARDNESS RELATIONSHIPS BETWEEN THE VARIOUS LAYERS

(75) Inventors: Yasushi Ichikawa, Tualatin, OR (US); Arthur Molinari, Portland, OR (US); Chien-Hsin Chou, Yun-lin Hsien (TW); Chen-Tai Liu, Yun-lin Hsien (TW)

(73) Assignee: NIKE, Inc., Beaverton, OR (US)

( * ) Notice: Subject to any disclaimer, the term of this patent is extended or adjusted under 35 U.S.C. 154(b) by 305 days.

This patent is subject to a terminal disclaimer.

(21) Appl. No.: 13/584,118

(22) Filed: Aug. 13, 2012

(65) Prior Publication Data

US 2014/0045618 A1 Feb. 13, 2014

(51) Int. Cl.
*A63B 37/04* (2006.01)
*A63B 37/00* (2006.01)
*A63B 45/00* (2006.01)
*C08L 23/08* (2006.01)

(52) U.S. Cl.
CPC ......... *A63B 37/0075* (2013.01); *A63B 37/0077* (2013.01); *A63B 37/0092* (2013.01); *A63B 37/0031* (2013.01); *A63B 37/0033* (2013.01); *A63B 37/0043* (2013.01); *A63B 37/0045* (2013.01); *A63B 37/0062* (2013.01); *A63B 37/0064* (2013.01); *A63B 37/0059* (2013.01); *A63B 45/00* (2013.01); *C08L 23/0876* (2013.01); *A63B 37/0018* (2013.01); *A63B 37/0078* (2013.01); *A63B 37/0083* (2013.01); *A63B 37/0087* (2013.01)
USPC ........................................................ 473/377

(58) Field of Classification Search
USPC .................................................. 473/351–378
See application file for complete search history.

(56) References Cited

U.S. PATENT DOCUMENTS

| | | | | |
|---|---|---|---|---|
| 4,683,257 | A * | 7/1987 | Kakiuchi et al. | 524/432 |
| 5,759,676 | A * | 6/1998 | Cavallaro et al. | 428/215 |
| 5,813,923 | A * | 9/1998 | Cavallaro et al. | 473/373 |
| 5,984,806 | A * | 11/1999 | Sullivan et al. | 473/373 |
| 6,394,915 | B1 * | 5/2002 | Nesbitt | 473/378 |
| 6,461,251 | B1 * | 10/2002 | Yamagishi et al. | 473/376 |
| 6,705,956 | B1 * | 3/2004 | Moriyama et al. | 473/371 |
| 6,780,126 | B2 * | 8/2004 | Ladd et al. | 473/376 |
| 6,953,403 | B2 * | 10/2005 | Sullivan | 473/374 |
| 7,148,290 | B2 * | 12/2006 | Fujisawa et al. | 525/193 |
| 7,361,101 | B2 * | 4/2008 | Kennedy et al. | 473/374 |
| 7,402,114 | B2 * | 7/2008 | Binette et al. | 473/373 |
| 7,438,650 | B2 * | 10/2008 | Kennedy et al. | 473/351 |
| 7,452,289 | B2 * | 11/2008 | Comeau | 473/373 |
| 7,612,134 | B2 * | 11/2009 | Kennedy et al. | 524/322 |
| 7,651,415 | B2 * | 1/2010 | Ladd et al. | 473/376 |

(Continued)

*Primary Examiner* — Alvin Hunter
(74) *Attorney, Agent, or Firm* — Honigman Miller Schwartz and Cohn LLP; Matthew H. Szalach; Jonathan P. O'Brien

(57) ABSTRACT

A high performance golf ball includes a resin inner core, a rubber outer core, and a cover. The resin inner core is made of a blend of highly neutralized polymers and a low flexural modulus ionomer, and may include a blend of different highly neutralized polymers. A hardness relationship between the layers of the ball is specified to achieve particular performance characteristics. The cover is a single layer ionomer cover, and may be made from a blend of different grades of the ionomer. The ball as a whole has properties to maximize performance and aesthetic properties, such as backspin off the irons, feel, and sound.

17 Claims, 4 Drawing Sheets

(56) References Cited

U.S. PATENT DOCUMENTS

| | | | |
|---|---|---|---|
| 7,652,086 B2* | 1/2010 | Sullivan et al. | 524/322 |
| 7,744,494 B2* | 6/2010 | Jordan et al. | 473/378 |
| 8,007,375 B2* | 8/2011 | Sullivan et al. | 473/374 |
| 8,070,625 B2* | 12/2011 | Sullivan et al. | 473/376 |
| 8,231,482 B2* | 7/2012 | Sullivan et al. | 473/376 |
| 8,262,512 B2* | 9/2012 | Sullivan et al. | 473/376 |
| 8,303,438 B2* | 11/2012 | Sullivan et al. | 473/376 |
| 8,308,586 B2* | 11/2012 | Sullivan et al. | 473/376 |
| 8,444,508 B2* | 5/2013 | Rajagopalan et al. | 473/378 |
| 8,492,470 B1* | 7/2013 | De Garavilla | 524/322 |
| 8,556,748 B2* | 10/2013 | Sullivan et al. | 473/376 |
| 8,618,197 B2* | 12/2013 | Sullivan et al. | 524/322 |
| 8,715,113 B2* | 5/2014 | Loper et al. | 473/376 |

* cited by examiner

| | Design 1 | Comp1 | Comp2 | Comp3 | Comp4 | Comp5 | Comp6 | Comp7 | Comp8 | Comp9 |
|---|---|---|---|---|---|---|---|---|---|---|
| Inner Core Material | | | | | | | | | | |
| First HNP | Yes | Yes | No | Yes | Yes | Yes, 60 PPH | Yes | No | Yes | Yes |
| Second HNP | Yes, in equal parts to First HNP | Yes, in equal parts to First HNP | Yes | Yes, in equal parts to First HNP | Yes, in equal parts to First HNP | Yes, 20 PPH | | Yes | | No |
| Low Flexural Modulus Ionomer + Additives, Fillers, Melt Flow Modifiers | Yes, 20 PPH | Yes, 20 PPH | Yes, 20 PPH | Yes, 20 PPH | | Yes, 20 PPH | Yes, 20 PPH | Yes, 20 PPH | Yes, 20 PPH | Yes, 20 PPH |
| Inner Core Diameter (mm) | 28 | 28 | 28 | 28 | 28 | 28 | 28 | 28 | 24 | 28 |
| Outer Core Material | NdPBR + PCTP | NdPBR + PCTP | NdPBR + PCTP | NdPBR + PCTP | NdPBR + PCTP | NdPBR + PCTP | NdPBR + PCTP | NdPBR + PCTP | NdPBR + PCTP | PBR |
| Outer Core Diameter (mm) | 39.3 | 39.3 | 39.3 | 39.3 | 39.3 | 39.3 | 39.3 | 39.3 | 39.3 | 39.3 |
| Cover Material | Surlyn | Surlyn | Surlyn | Surlyn | Surlyn | Surlyn | Surlyn | Surlyn | Surlyn | Surlyn |
| First Surlyn Grade, % | 50 | 50 | 50 | 40 | 50 | 50 | 40 | 30 | 40 | |
| Second Surlyn Grade, % | 25 | 25 | 25 | 30 | 25 | 50 | 30 | 35 | 30 | |
| Third Surlyn Grade, % | 25 | 25 | 25 | 30 | 25 | 0 | 30 | 35 | 30 | |
| Cover Thickness (mm) | 1.7 | 1.7 | 1.7 | 1.7 | 1.7 | 1.7 | 1.7 | 1.7 | 1.7 | 1.7 |
| Cover Hardness, Shore D | 64.5 | 66.7 | 64.4 | 64.9 | 68.8 | 71.6 | 65.4 | 61.7 | | 72.1 |

FIG. 2

| | Design 1 | Comp1 | Comp2 | Comp3 | Comp4 | Comp5 | Comp6 | Comp7 | Comp8 | Comp9 |
|---|---|---|---|---|---|---|---|---|---|---|
| Ball Compression (mm) | 3.31 | 3.32 | 3.51 | 3.33 | 3.29 | 3.09 | 3.12 | 3.85 | 3.00 | 3.00 |
| Moment of Inertia (g/cm^2) | 84.0 | 84.1 | 83.9 | 83.7 | 84.3 | 84.7 | 84.1 | | 83.1 | |
| COR Durability (# of shots) | 150+ | 150+ | 150+ | 150+ | 200+ | 103, 16 | 150+ | 60, 44 | 150+ | 150+ |
| Driver Initial Velocity (mph) | 140.8 | 141.2 | 139.9 | 140.6 | | | 141.8 | 139.2 | 141.4 | 141.6 |
| Driver Launch Angle (degrees) | 11.3 | 11.4 | 11.7 | 11.5 | | | 11.2 | 11.3 | 11.4 | 11.4 |
| Driver Backspin (rpm) | 3057 | 3027 | 2868 | 3158 | | | 3299 | 3094 | 3360 | 3039 |
| 6-iron Initial Velocity (mph) | 112.7 | 112.7 | 112.6 | 112.5 | | | 113.1 | 112.3 | 112.4 | 112.5 |
| 6-iron Launch Angle (degrees) | 15.8 | 15.9 | 16.2 | 15.9 | | | 15.6 | 16.1 | 15.6 | 15.6 |
| 6-iron Backspin (rpm) | 6102 | 5928 | 5550 | 6029 | | | 6428 | 5529 | 6480 | 6381 |
| Wedge Initial Velocity (mph) | 52.4 | | 53.1 | | | 53.7 | | | | 52.3 |
| Wedge Launch Angle (degrees) | 33.3 | | 33.7 | | | 36.1 | | | | 38.4 |
| Wedge Backspin (rpm) | 4643 | | 4768 | | | 3881 | | | | 2832 |
| 15 Yd Wedge Initial Velocity (mph) | 26.5 | | | | 25.7 | | | | | |
| 15 Yd Wedge Launch Angle (degrees) | 39.1 | | | | 42.6 | | | | | |
| 15 Yd. Wedge Backspin (rpm) | 3250 | | | | 2554 | | | | | |
| Driver Carry Distance (m) | 235.1 | | 236.3 | | | | | 232.4 | | |
| Driver Total Distance (m) | 243.7 | | 246.6 | | | | | 244.6 | | |
| 6-iron Carry Distance (m) | 149.9 | | 152.0 | | | | | 151.9 | | |
| 6-iron Total Distance (m) | 153.2 | | 153.7 | | | | | 154.2 | | |

FIG. 3

| | Diameter (mm) | Weight (g) | Shore D hardness | Specific Gravity (g/cc) | 10-130 Compression (mm) | COR, 131 ft/s | COR, 140 ft/s | COR, 160 ft/s |
|---|---|---|---|---|---|---|---|---|
| Design 1, inner core | 28.3 | 11.47 | 51-52 | 0.955 | 3.48 | 0.8229 | 0.8103 | 0.7837 |
| Comp9, inner core | 28.5 | 11.67 | 56 | 0.956 | 3.25 | 0.813 | 0.8005 | 0.7811 |
| Design 1, outer core | 39.18 | 36.8 | 48 | 1.283 | 3.51 | 0.7939 | 0.7831 | 0.7526 |
| Comp9, outer core | 39.31 | 37.02 | 54-55 | 1.288 | 3 | 0.7927 | 0.782 | 0.7538 |
| Design 1, cover | 42.8 | 45.55 | 63-64 | 0.964 | 3.19 | 0.801 | 0.7871 | 0.759 |
| Comp9, cover | 42.8 | 45.62 | 70-71 | 0.963 | 2.63 | 0.8053 | 0.7952 | 0.7701 |

FIG. 4

MULTILAYER GOLF BALL WITH RESIN INNER CORE AND SPECIFIED HARDNESS RELATIONSHIPS BETWEEN THE VARIOUS LAYERS

BACKGROUND

The game of golf is an increasingly popular sport at both amateur and professional levels. A wide range of technologies related to the manufacture and design of golf balls are known in the art. Such technologies have resulted in golf balls with a variety of play characteristics and durability. For example, some golf balls have a better flight performance than other golf balls. Some golf balls with a good flight performance do not have a good feel when hit with a golf club. Some golf balls with good performance and feel lack durability. Thus, it would be advantageous to make a durable golf ball with a good flight performance that also has a good feel.

SUMMARY

A high performance golf ball includes a resin inner core, a rubber outer core, and a cover. The resin inner core is made of a blend of different highly neutralized polymers and a low flexural modulus ionomer. The cover is a dimpled ionomer cover, made of a blend of different grades of Surlyn®. This construction provides desirable compression, coefficient of restitution, and moment of inertia properties. The ball as a whole has properties to maximize performance and aesthetic properties, such as driver distance, iron control, feel, and sound. The ball is particularly well-suited to balancing driver backspin and iron/wedge backspin so that driver trajectory is maintained or improved while greater control and spinnability and control are enhanced.

In one aspect, the invention provides a golf ball comprising an inner core layer, wherein the inner core layer comprises a first highly neutralized polymer with a first flexural modulus, a second highly neutralized polymer with a second flexural modulus, and a low flexural modulus ionomer, and wherein the inner core layer has a diameter between about 24 mm and about 30 mm. The golf ball further comprises an outer core layer, wherein the outer core layer surrounds and encompasses the inner core layer, and wherein the outer core layer comprises a rubber composition. The golf ball further comprises a cover layer, wherein the cover layer surrounds and encompasses the outer core layer, wherein the first highly neutralized polymer is about 20 to 60 parts by weight of the inner core layer, wherein a ratio of the second flexural modulus to the first flexural modulus is less than about 2, wherein the low flexural modulus ionomer has a flexural modulus of less than about 8,000 psi, wherein the low flexural modulus ionomer is from about 1 to about 50 parts by weight of the inner core layer, wherein the inner core layer has a first surface hardness, the outer core layer has a second surface hardness, and the cover layer has a third surface hardness, wherein the third surface hardness is greater than the first surface hardness, and the first surface hardness is greater than the second surface hardness, wherein a first difference between the first surface hardness and the second surface hardness is greater than about 1 and less than about 8 Shore D units, and wherein a second difference between the third surface hardness and the second surface hardness is less than about 20 and greater than about 10 Shore D units.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 2 is a table showing the structure and static data of the exemplary embodiment and comparative example high performance golf balls;

FIG. 3 is performance data collected from a ball made according to the present design and comparative example high performance golf balls; and FIG. 4 is a table showing various structural and static data components of the exemplary embodiment and a commercially available ball.

DETAILED DESCRIPTION

Figure 1:
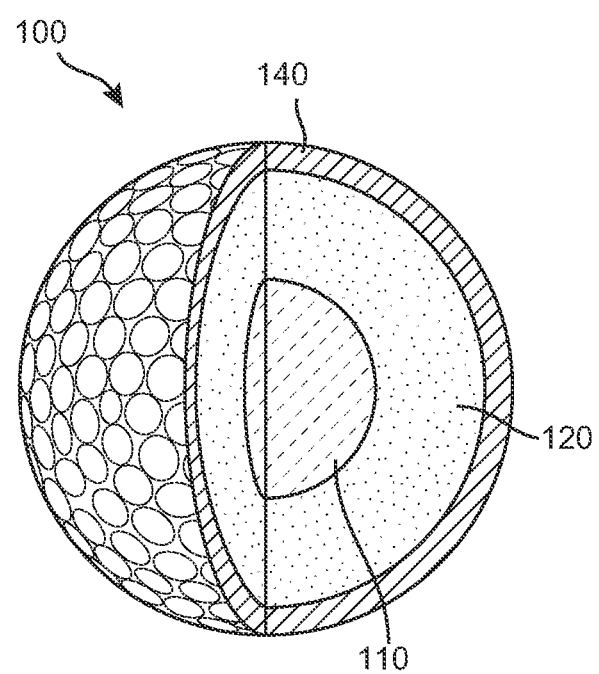
FIG. 1 is an exemplary embodiment of a golf ball with a resin inner core and a rubber outer core.

Generally, the present disclosure relates to a golf ball with a resin inner core and a rubber outer core. While many advantageous performance and feel properties may be found in a golf ball with a resin inner core and a rubber outer core, it is believed by the inventors that the design disclosed herein allows these advantageous performance and feel properties to be more fully realized.

The golf ball may be made by any suitable process. The process of making the golf ball may be selected based on a variety of factors, but in most embodiments will generally include injection molding the resin inner core, compression molding the rubber outer core onto the resin inner core, and then injection molding the resin cover onto the rubber outer core. For example, the process of making the golf ball may be selected based on the type of materials used and/or the number of layers included. Exemplary processes are discussed below with respect to the individual layers of the exemplary embodiment.

As used herein, the term "about" is intended to allow for engineering and manufacturing tolerances, which may vary depending upon the type of material and manufacturing process, but which are generally understood by those in the art. For example, "about" generally corresponds to +/−2 units, regardless of scale, when measuring hardness; +/−0.15 mm when measuring compression when the initial load is 10 kg and the final load is 130 kg; and +/−0.005 when measuring specific gravity. Also, as used herein, unless otherwise stated, compression, hardness, COR, and flexural modulus are measured as follows:

Compression deformation: The compression deformation herein indicates the deformation amount of the ball under a force; specifically, when the force is increased to become 130 kg from 10 kg, the deformation amount of the ball under the force of 130 kg subtracts the deformation amount of the ball under the force of 10 kg to become the compression deformation value of the ball. All of the tests herein are performed using a compression testing machine available from Automated Design Corp. in Illinois, USA or EKTRON TEK Co., LTD.; Model name: EKTRON-2000 GBMD-CS. Both compression tester machines can be set to apply a first load and obtain a first deformation amount, and then, after a selected period, apply a second, typically higher load and determine a second deformation amount. Thus, the first load herein is 10 kg, the second load herein is 130 kg, and the compression deformation is the difference between the second deformation and the first deformation. Herein, this distance is reported in millimeters. The compression can be reported as a distance, or as an equivalent to other deformation measurement techniques, such as Atti compression.

Hardness: Hardness of golf ball layer is measured generally in accordance with ASTM D-2240, but measured on the land area of a curved surface of a molded ball. Other types of hardness, such as Shore C or JIS-C hardnesses may be provided as specified herein. For material hardness, it is measured in accordance with ASTM D-2240 (on a plaque).

Method of measuring COR: A golf ball for test is fired by an air cannon at an initial velocity of 131 ft/s, and a speed monitoring device is located over a distance of 0.6 to 0.9 meters from the cannon. When striking a steel plate positioned about 1.2 meters away from the air cannon, the golf ball rebounds through the speed-monitoring device. The return velocity divided by the initial velocity is the COR. A COR measuring system is available from ADC.

Durability: Durability is generally measured by following the protocol for measuring COR, as described above, for 150 shots or until the golf ball fails. When the golf ball fails, the COR noticeably and suddenly drops.

Flexural Modulus: The material is measured generally in accordance with ASTM D790, which measures the deflection in a beam of the material in a three point bending system.

Any ball described herein is considered conforming if the ball adheres to the Rules of Golf established by the United States Golf Association (USGA). All other balls are considered non-conforming.

As shown in FIG. 1, golf ball 100 includes an inner core layer 110, an outer core layer 120, and a cover layer 140. Inner core layer 110 is generally made from a resin. Outer core 120 is generally made from rubber. Cover layer 140 is generally made from a resin material. Outer cover later 140 includes dimples. Cover layer 140 is coated by a single top coat or includes two layers of coating, where one layer is a primer layer adjacent outer cover layer 140 and the other layer is a top coat positioned on the primer layer. The inventors have found that an exemplary embodiment of this three-piece design, discussed herein in greater detail and referred to as either the exemplary embodiment or Design 1, has performance properties that may prove particularly advantageous to amateur golfers whose focus is on improving flight distance. While the exemplary embodiment has good flight performance, the exemplary embodiment also has satisfactory spinnability and control on iron and wedge shots along with good feel and durability.

Inner core layer 110 is made from a blend of highly neutralized polymer compositions, sometimes called highly neutralized acid polymers or highly neutralized acid polymer compositions, and fillers. Highly neutralized polymer compositions may be considered to be at least 80 percent neutralized, though many highly neutralized polymer compositions are neutralized to greater than 90 percent, greater than 95 percent, or are even substantially completely neutralized. Inner core layer 110 generally includes a first highly neutralized polymer and a second highly neutralized polymer. Inner core layer 110 generally includes HPF resins such as HPF2000 and HPF AD1035, produced by E. I. DuPont de Nemours and Company.

The flexural modulus of the first highly neutralized polymer in some embodiments is less than about 8,000 psi. In some embodiments, the first highly neutralized polymer is about 20 to about 60 parts by weight of the total composition of the core. In some embodiments, the flexural modulus of the second highly neutralized polymer is greater than about 10,000 psi. In some embodiments, the ratio of the flexural modulus of the second highly neutralized polymer to the flexural modulus of the first highly neutralized polymer is 2 or less.

Inner core layer 110 also includes a third component, which may be an ionomer. In some embodiments, the ionomer is a low flexural modulus ionomer, with a flexural modulus of less than about 8,000 psi. For the purposes of this disclosure, a low flexural modulus ionomer may be considered to have a flexural modulus of less than 8,000 psi when measured in accordance with ASTM D790. In some embodiments, the flexural modulus of the low flexural modulus ionomer is between about 4,000 psi and about 8,000 psi. In some embodiments, the third component is Surlyn® 6320, available from E.I. DuPont de Nemours and Company. In some embodiments, the third component is Surlyn® 9320 or Surlyn® 9320W, also available from E.I. DuPont de Nemours and Company. In other embodiments, the low flexural modulus ionomer may be another type of ionomer. The low flexural modulus ionomer ranges from about 1 to about 50 parts by weight, based on 100 parts by weight of inner core layer 110. In the exemplary embodiment, the low flexural modulus ionomer and the additives, fillers, and melt flow modifier are about 20 parts by weight of inner core layer 110, based on 100 parts by weight of inner core layer 110. By adding the low flexural modulus ionomer to the resin inner core, the flexibility of ball design is increased. For example, a designer is more able to fine tune COR, flexural modulus, hardness, specific gravity, spin, speed, launch angle, and impact sound by including the low flexural modulus ionomer. Further the manufacturing facility can account more readily for inconsistencies in any single material when incorporating the low flexural modulus ionomer.

Inner core layer 110 may also include additives, fillers, and flow modifiers. Suitable additives and fillers may include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, acid copolymer wax, surfactants. Suitable fillers may also include inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate. Suitable fillers may also include high specific gravity metal powder fillers, such as tungsten powder and molybdenum powder. Suitable melt flow modifiers may include, for example, fatty acids and salts thereof, polyamides, polyesters, polyacrylates, polyurethanes, polyethers, polyureas, polyhydric alcohols, and combinations thereof.

In some embodiments, inner core layer 110 may have a high resilience. Such a high resilience may cause golf ball 100 to have increased carry and distance. The COR value of inner core layer 110 is greater than the COR value of golf ball 100. In some embodiments, inner core layer 110 may have a coefficient of restitution (COR) value ranging from 0.775 to 0.89, depending on the speed of the inner core layer during the test. In the exemplary embodiment, inner core layer 110 has a first COR of about 0.810 to about 0.835 when measured with an initial velocity 131 ft/s, a second COR of about 0.805 to about 0.815 when measured with an initial velocity of 140 ft/s, and a third COR of about 0.775 to about 0.790 when measured with an initial velocity 160 ft/s; the average of the first, second, and third COR is greater than 0.8. These COR ranges are advantageous so that the overall COR value of golf ball 100 may be dampened by the outer layers to a desired level, such as about 0.8. It is believed that such an inner core having a higher COR than 0.8 may have an undesirable feel. In the exemplary embodiment, the inner core layer 110 has a COR of 0.8229 when measured with an initial velocity of 131 ft/s, about 0.8103 when measured with an initial velocity of 140 ft/s, and about 0.7837 when measured with an initial velocity of 160 ft/s.

Inner core layer 110 has a diameter between about 24 mm and 30 mm, and in the exemplary embodiment has a diameter of about 28 mm. It is believed by the inventors that if the inner core diameter is less than about 24 mm, then the initial velocity off of the driver may be too low. It is also believed that if the inner core diameter is greater than about 30 mm, then the feel may be too hard and the ball may spin too much off the driver, thereby decreasing driver distance. A diameter of about 28 mm, in combination with the other layers of the exemplary embodiment, appears to balance driver initial velocity and feel, as will be discussed later.

Inner core layer 110 has a specific gravity of less than 1, and in the exemplary embodiment inner core layer 110 has a specific gravity of about 0.955. It is believed by the inventors that if the specific gravity of inner core layer 110 is higher than about 1, then the moment of inertia of the ball and the spin may be negatively impacted. The weight of inner core layer 110 in the exemplary embodiment is about 11.47 g.

In the exemplary embodiment, inner core layer 110 has a compression deformation value of between about 3 mm and about 5 mm, when measured with an initial load of 10 kg and a final load of 130 kg. It is believed by the inventors that a compression deformation value of less than 2 mm results in a ball that may lack durability, particularly with respect to delamination with the outer core layer, undesirable high pitched sound properties, an overly hard feel, and reduction of distance off the driver. It is also believed that a compression deformation value of greater than 5 mm results in a ball with too soft a feel, an undesirable amount of spin off of the mid-irons, and undesirable low pitched sound properties. In the exemplary embodiment, the compression of inner core layer 110 is about 3.48 mm when measured with an initial load of 10 kg and a final load of 130 kg.

Inner core layer 110 may have a surface Shore D hardness of from 40 to 60. In the exemplary embodiment, inner core layer 110 has a surface Shore D hardness between 51 and 52.

Inner core layer 110 may be made by any suitable process, but in the examples herein, inner core layer 110 is made by an injection molding process. During injection molding process, the temperature of the injection machine may be set within a range of about 190° C. to about 220° C. Generally, before the injection molding process, the at least two highly neutralized polymer compositions may be kept sealed in a moisture-resistant dryer capable of producing dry air. Drying conditions for the highly neutralized polymer composition may include 2 to 24 hours at a temperature below 50° C.

Outer core layer 120 generally surrounds and encloses inner core layer 110. Outer core layer 120 may be considered to be positioned radially outward of inner core layer 110. Outer core layer 120 in the exemplary embodiment comprises a thermoset rubber material. Outer core layer 120 in the some embodiments has a thickness of between 4 mm and 8 mm. In the exemplary embodiment, the thickness of outer core layer 120 is about 5.5 mm. In the exemplary embodiment, where inner core layer 110 is made of a highly neutralized polymer composition having a diameter of about 28 mm, if the thickness of outer core layer 120 is less than about 4 mm, it is believed by the inventors that the feel of the golf ball may be too hard and may produce too much spin. It is believed by the inventors that the beneficial performance and aesthetic characteristics are maximized when the thickness of outer core layer 120 ranges from about 5.0 mm to about 6.0 mm. In some embodiments, the diameter of the core (inner core layer 110 and outer core layer 120 together) ranges from about 34 mm to about 40 mm. In the exemplary embodiment, the diameter of the core is about 39.1 mm.

Outer core layer 120 is generally formed by crosslinking a polybutadiene rubber composition as described in U.S. patent application Ser. No. 12/827,360, entitled Golf Balls Including Crosslinked Thermoplastic Polyurethane, filed on Jun. 30, 2010, and applied for by Chien-Hsin Chou et al., the disclosure of which is hereby incorporated by reference in its entirety. Various additives may be added to the base rubber to form a compound. The additives may include a cross-linking agent and a filler. In some embodiments, the cross-linking agent may be zinc diacrylate, magnesium acrylate, zinc methacrylate, or magnesium methacrylate. In some embodiments, zinc diacrylate may provide advantageous resilience properties. The filler may be used to alter the specific gravity of the material. The filler may include zinc oxide, barium sulfate, calcium carbonate, or magnesium carbonate. In some embodiments, zinc oxide may be selected for its advantageous properties. Metal powder, such as tungsten, may alternatively be used as a filler to achieve a desired specific gravity. In some embodiments, the specific gravity of outer core layer 120 may be from about 1.05 to about 1.45. In some embodiments, the specific gravity of outer core layer 120 may be from about 1.05 to about 1.35. In the exemplary embodiment, the specific gravity of outer core layer 120 is about 1.28. In the exemplary embodiment, the difference between the specific gravity of outer core layer 120 and the specific gravity of inner core layer 110 is greater than about 0.2.

The weight of outer core layer 120 and inner core layer together is about 36.8 g.

In some embodiments, a polybutadiene synthesized with a rare earth element catalyst may be used to form outer core layer 120. Such a polybutadiene may provide excellent resilience performance of golf ball 100. Examples of rare earth element catalysts include lanthanum series rare earth element compound, organoaluminum compound, and almoxane and halogen containing compounds. Polybutadiene obtained by using lanthanum rare earth-based catalysts usually employs a combination of a lanthanum rare earth (atomic number of 57 to 71) compound, such as a neodymium compound.

In some embodiments, a polybutadiene rubber composition having at least from about 0.5 parts by weight to about 5 parts by weight of a halogenated organosulfur compound may be used to form outer core layer 120. In some embodiments, the polybutadiene rubber composition may include at least from about 1 part by weight to about 4 parts by weight of a halogenated organosulfur compound. The halogenated organosulfur compound may be selected from the group consisting of pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol; 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol; pentabromothiophenol; 2-bromothiophenol; 3-bromothiophenol 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; and their zinc salts, the metal salts thereof and mixtures thereof.

In the exemplary embodiment, outer core layer 120 is made from a composition of neodymium-catalyzed polybutadiene rubber (NdPBR) compounded with activated pentachlorothiophenol (PCTP).

In some embodiments, outer core layer 120 has a surface hardness, as measured on the curved surface of outer core layer 120, which is less than the surface hardness of inner core layer 110. It is believed by the inventors that driver distance for lower club head speeds and feel are improved when outer core layer 120 has a lower hardness than inner core layer 110. Additionally, for golfers with lower club head speeds, such as less than about 90 mph, a softer outer core can make driver and iron shots have a softer feel, while the harder inner core maintains flight distance. In some embodiments, outer core layer 120 may have a surface Shore D hardness of from about 35 to less than 50. In an exemplary embodiment, outer core layer has a Shore D hardness of about 48.

In some embodiments, outer core layer 120, enclosing inner core layer 110, has a compression between 3 mm and 4 mm, when measured with an initial load of 10 kg and a final load of 130 kg. It is believed by the inventors that a compression deformation value of less than 3 mm results in a ball that may lack durability, particularly with respect to delamination between inner core layer 110 and outer core layer 120, have an undesirably hard feel, have undesirable high pitched sound properties, and have poor distance off the driver. It is also believed that a compression deformation value of greater than 4 mm may produce an undesirable amount of spin off of the mid-irons, short distance off the driver, and undesirable low pitched sound properties. In the exemplary embodiment, outer core layer 120 has a compression of about 3.51 when measure with an initial load of 10 kg and a final load of 130 kg.

Outer core layer 120 also has a coefficient of restitution, measured by firing the completed core (inner core and outer core) from the testing cannon. In some embodiments, the COR of outer core layer 120 ranges from about 0.75 to less than about 0.8. The COR of outer core layer 120 of the exemplary embodiment is about 0.7939 when measured with an initial velocity of 131 ft/s, about 0.7831 when measured with an initial velocity of 140 ft/s, and about 0.7526 when measured with an initial velocity of 160 ft/s.

Outer core layer 120 may be made by any suitable process. For example, in some embodiments, outer core layer 120 may be made by a compression molding process. The process of making the outer core layer may be selected based on a variety of factors. For example, the process of making the outer core layer may be selected based on the type of material used to make the outer core layer and/or the process used to make the other layers.

In some embodiments, outer core layer 120 may be made through a compression molding process including a vulcanization temperature ranging from 130° C. to 190° C. and a vulcanization time ranging from 5 to 20 minutes. In some embodiments, the vulcanization step may be divided into two stages: (1) the outer core layer material may be placed in an outer core layer-forming mold and subjected to an initial vulcanization so as to produce a pair of semi-vulcanized hemispherical cups and (2) a prefabricated inner core layer may be placed in one of the hemispherical cups and may be covered by the other hemispherical cup and vulcanization may be completed. In some embodiments, the surface of inner core layer 110 placed in the hemispherical cups may be roughened before the placement to increase adhesion between inner core layer 110 and outer core layer 120. In some embodiments, inner core surface may be pre-coated with an adhesive before placing inner core layer 110 in the hemispherical cups to enhance the durability of the golf ball and to enable a high rebound.

Cover layer 140 substantially surrounds and encompasses outer core layer 120. Cover layer 140 may be considered to be positioned radially outward of outer cover layer 120.

In some embodiments, cover layer 140 may be made from a thermoplastic material including at least one of an ionomer resin, a highly neutralized polymer composition, a polyamide resin, a polyester resin, and a polyurethane resin. In some embodiments, cover layer 140 is made from Surlyn®, and, in particular, a blend of different grades of Surlyn. In some embodiments, two grades of Surlyn are blended to make the material of cover layer 140. In the exemplary embodiment, cover layer 140 is made from a blend of three grades of Surlyn. In the exemplary embodiment, the first grade of Surlyn is about 50% of the blend, while the second grade and third grade of Surlyn are each about 25% of the blend for cover layer 140. In some embodiments, the percentage in the cover material blend of the first grade of Surlyn may range from about 30 to about 50, with 30%, 40%, and 50% being particularly advantageous percentages. In some embodiments, the percentage in the cover material blend of the second grade of Surlyn may range from about 25 to about 50, with 25%, 30%, 35%, and 50% being particularly advantageous percentages. In some embodiments, the percentage in the cover material blend of the third grade of Surlyn may range from zero (0) to about 35, with no third grade, 25%, 30%, and 35% being particularly advantageous percentages.

In some embodiments, cover layer 140 of golf ball 100 may have a Shore D hardness, as measured on the curved surface, ranging from about 60 to about 73. In some embodiments, the Shore D hardness of cover layer 140 is greater than about 62 and less than about 68. Cover hardness of less than about 68 Shore D maintains soft feel while chipping and putting. In some embodiments, the Shore D hardness of cover layer 140 is less than about 65. This hardness range yields beneficial feel, spinnability off of irons and wedges, and durability. In the exemplary embodiment, cover layer 140 has a Shore D hardness between about 63 and about 64.

The relationship of the hardnesses of the layers of golf ball 100 to each other can also impact feel, durability, spin, and both driver and iron distance. Inner core layer 110 has a first surface hardness, outer core layer 120 has a second surface hardness, and cover layer 140 has a third surface hardness. The third surface hardness is greater than the first surface hardness. The first surface hardness is greater than the second surface hardness. The difference between the first surface hardness and the second surface hardness is greater than about 1 and less than about 8. The difference between the third surface hardness and the second surface hardness is greater than about 10 and less than about 25. In some embodiments, the difference between the third surface hardness and the second surface hardness is greater than about 13 and less than about 20.

In some embodiments, cover layer 140 of golf ball 100 may have a thickness ranging from 0.5 mm to 2 mm. For example, cover layer 140 may have a thickness of 1 mm. In some embodiments, cover layer 140 may have a thickness ranging from 1 mm to 2 mm. In the exemplary embodiment, cover layer 140 has a thickness of about 1.7 mm. In any embodiment, cover layer 140 may have a thickness selected to ensure that golf ball 100 is conforming. In the exemplary embodiment, golf ball 100 has an outer diameter of about 42.8 mm.

In some embodiments, golf ball 100 may have a moment of inertia between about 80 g/cm^2 and about 90 g/cm^2. In some embodiments, golf ball 100 may have a moment of inertial between about 83 g/cm^2 and about 85 g/cm^2. In the exemplary embodiment, golf ball 100 has a moment of inertia of about 84 g/cm^2. Such a moment of inertia may produce a desirable distance and trajectory, particularly when golf ball 100 is struck with a driver or driven against the wind.

In some embodiments, golf ball 100 may include a ball compression deformation of 2.5 mm to 4 mm when measured with an initial load of 10 kg and a final load of 130 kg. In some embodiments, golf ball 100 may have compression deformation of 3 mm to 4 mm when measured with an initial load of 10 kg and a final load of 130 kg. As is well known in the art, compression of a golf ball can influence driver distance and feel. In the exemplary embodiment, the ball compression deformation is about 3.19 when measured with an initial load of 10 kg and a final load of 130 kg.

In the exemplary embodiment, golf ball 100 has a weight of 45.55 g.

Golf ball 100 as a whole also has a ball COR. The exemplary embodiment has a COR of 0.801 at an initial velocity 131 ft/s, 0.7871 at an initial velocity 140 ft/s, and 0.759 at an initial velocity 160 ft/s. Golf ball 100 may be considered to have a first COR, the COR of inner core layer 110 measured with an initial velocity of 131 ft/s; a second COR, the COR of outer core layer 120 measured with an initial velocity of 131 ft/s; and a third COR or ball COR, the COR of the ball when measured with an initial velocity of 131 ft/s. The first COR is greater than the second COR and the third COR. The third COR is greater than the second COR. The difference between the first COR and the second COR is greater than about 0.02. The difference between the first COR and the third COR is greater than about 0.015. This design provides a beneficial driver ball speed. It is possible, thus, for the designer to optimize sound and feel off the driver while maintaining high initial velocity off the driver.

In some embodiments, golf ball 100 may have 300 to 400 dimples on the outer surface of cover layer 140. In some embodiments, golf ball 100 may have 310 to 390 dimples on the outer surface of cover layer 140. In some embodiments, golf ball 100 may have 320 to 380 dimples on the outer surface of cover layer 140. When the total number of the dimples is smaller than 300, the resulting golf ball may create a blown-up trajectory, which reduces flight distance. On the other hand, when the total number of the dimples is greater than 400, the trajectory of the resulting golf ball may be easy to drop, which reduces the flight distance. In the exemplary embodiment, golf ball 100 has 314 dimples.

In a particularly successful embodiment of a high performance golf ball according to the present design, referred to above as the exemplary embodiment and below as Design 1, in terms of durability, driver distance, iron and wedge spin, and aesthetically pleasing feel and sound, the details of Table 1 were included in the design. The inner core and outer core in Design 1 are adhered together with an adhesive.

TABLE 1

| Details of Design 1 | |
| --- | --- |
| Inner Core | HPF 2000 |
|  | HPF AD1035 |
|  | Surlyn |
|  | Additives/Fillers/Melt Flow Modifiers |
| Outer Core | NdPBR |
|  | PCTP |
| Outer Cover | Surlyn, blend of three grades |
| Coating | Paint |

Comparisons were made against other balls of similar construction but with minor construction variations and one commercially available high performance golf ball. All of the comparison balls have a resin inner core, a rubber outer core, and a Surlyn cover. All of the comparison balls have an inner core diameter of 28 mm.

FIG. 2 shows the differences in structure and static performance data between Design 1 and comparison balls Comp1-Comp9. The static performance data includes ball compression, ball COR, ball MOI, and durability.

FIG. 3 shows performance data gathered for Design 1 and comparison balls Comp1-Comp9. For the data shown in FIG. 3, the following test set up and conditions were used:

Driver: A VR Pro driver available from Nike Golf of Beaverton, Oreg. with a 9.5 degree loft angle was swung by a robot with a club head speed of about 96 mph, plus or minus 1 mph (to account for swing variations and tolerances.) Ball impact was high top-to-bottom and centered heel-to-toe on the face. Trackman radar system was used for measurements.

6-Iron: A VR Pro 6-iron available from Nike Golf of Beaverton, Oreg. with a 28.0 degree loft angle was swung by a robot with a club head speed of about 79 mph, plus or minus 1 mph (to account for swing variations and tolerances.) Ball impact was 1-2 grooves from the bottom and centered heel-to-toe on the face. Trackman radar system was used for measurements.

Wedges: A VR Pro wedge available from Nike Golf of Beaverton, Oreg. with a 52.0 degree loft angle was swung by a robot indoors. Ball impact was 1-2 grooves from the bottom and centered heel-to-toe on the face. GC2 photo-based system was used for measurements.

As can be seen from the data in FIGS. 2 and 3, Design 1 offers benefits over similar three-piece resin core balls. In particular, Design 1 strikes a balance between backspin off the driver, the mid-irons, and wedge to maximized optimal trajectories and short game control.

For example, comparing Design 1 and Comp1, as shown in FIG. 2, Comp1 has a cover that is about 2 Shore D units harder cover than Design 1. As shown in FIG. 3, the performance difference from this cover hardness difference is a small reduction in driver backspin and a larger reduction in 6-iron backspin. While a reduction in driver backspin could be beneficial in limiting a tendency for a ball trajectory to blow up during a drive, the relatively larger reduction in 6-iron backspin could make the Comp1 more difficult to control in the short game. Therefore, Design 1 is a better choice of ball than Comp1 for golfers looking for more spin off the irons but who do not generally have trouble with driver ball trajectory.

Comparing Design 1 with Comp2, as shown in FIG. 2, Comp2 includes only one highly neutralized polymer in the inner core layer composition as opposed to the two highly neutralized polymers in the inner core layer composition in Design 1. As shown in FIG. 3, the performance difference due to this cover hardness difference is also a reduction in driver backspin, though larger than the reduction in backspin over Comp1 and a larger reduction in 6-iron backspin. While a reduction in driver backspin could be beneficial in limiting a tendency for a ball trajectory to blow up during a drive, the relatively large reduction in driver spin could have a tendency for the trajectory to fly too low. Also, the reduced 6-iron backspin could make the Comp2 more difficult to control in the short game. Therefore, Design 1 is a better choice of ball than Comp2 for golfers looking for more spin off the irons but who do not generally have trouble with driver ball trajectory.

Comparing Design 1 with Comp3, as shown in FIG. 2, Comp3 includes a slightly different cover composition in that the relative percentages of the three grades of Surlyn are different in Comp3 and Design 1. This cover change produces a slightly harder cover, which impacts driver and 6-iron backspin. In this comparison, as shown in FIG. 3, driver backspin is increased, which may augment the tendency of the ball trajectory to blow up and thereby reduce carry and/or total distance over Design 1. Further the decrease in 6-iron backspin, while somewhat low, could negatively impact short game control. Therefore, Design 1 is a better choice of ball than Comp3 for golfers looking for improved control over the trajectory off the driver and who generally do not have trouble with short game control.

Comparing Design 1 with Comp4, as shown in FIG. 2, Comp4 has a cover that is 4 Shore D units harder than the cover of Design 1. The harder cover of Comp4 could negatively impact feel compared with Design 1. As shown in FIG. 3, the harder cover significantly reduces wedge backspin as compared to Design 1. As such, significant control in the wedge shots is sacrificed. Therefore, Design 1 is a better choice of ball than Comp4 for golfers looking for improved control on wedge shots.

Comparing Design 1 with Comp5, as shown in FIG. 2, Comp5 has a different inner core composition than Design 1 and a much harder cover than Design 1. Comp5 has a different blend of the three grades of Surlyn than Design 1 and is 7 Shore D units harder than the cover of Design 1. The durability of Comp5 is dramatically reduced, as Comp5 cannot withstand the standard 150 shots from the COR testing cannon. The harder cover significantly reduces wedge backspin as compared to Design 1. Significant control in the wedge shots is sacrificed. Therefore, durability aside, Design 1 is a better choice of ball than Comp5 for golfers looking for improved control on wedge shots but who generally do not have trouble with driver trajectory.

Comparing Design 1 with Comp6, Comp6 includes only one highly neutralized polymer in the inner core layer composition as opposed to the two highly neutralized polymers in the inner core layer composition in Design 1. As can be seen in FIG. 3, driver backspin is significantly increased compared with Design 1. This increase in driver backspin can augment the tendency of a driver trajectory to blow up. Therefore, Design 1 is a better choice of ball than Comp6 for golfers who have a tendency to hit driver trajectories that blow up, which can negatively impact total distance and the ability of the trajectory of the ball to remain straight.

Comparing Design 1 with Comp7, Comp7 includes only one highly neutralized polymer in the inner core layer composition as opposed to the two highly neutralized polymers in the inner core layer composition in Design 1. Also, as shown in FIG. 2, Comp7 has a cover that is 2.8 Shore D units softer than the cover of Design 1. Comp7 has a slightly softer compression than Design 1, but a COR measured at 131 ft/s that is reduced by about 0.02. As can be seen in FIG. 3, the durability of Comp7 is dramatically reduced, as Comp7 cannot withstand the standard 150 shots from the COR testing cannon. Also, the backspin off the 6-iron is dramatically reduced. Therefore, in addition to poor durability, Comp7 is also more difficult to control off the 6-iron, which makes Design 1 a better choice of ball in terms of durability and short game control.

Comparing Design 1 with Comp8, Comp8 includes only one highly neutralized polymer in the inner core layer composition as opposed to the two highly neutralized polymers in the inner core layer composition in Design 1. Also, as shown in FIG. 2, the inner core layer diameter of Comp8 is only 24 mm, compared to an inner core layer diameter of 28 mm for Design 1. As can be seen in FIG. 3, driver backspin is significantly increased compared with Design 1. This increase in driver backspin can augment the tendency of a driver trajectory to blow up. Therefore, Design 1 is a better choice of ball than Comp8 for golfers who have a tendency to hit driver trajectories that blow up, which can negatively impact total distance and the ability of the trajectory of the ball to remain straight.

Comparing Design 1 with Comp9, Comp9 includes only one highly neutralized polymer in the inner core layer composition as opposed to the two highly neutralized polymers in the inner core layer composition in Design 1. Also, as shown in FIG. 2, the cover hardness of Comp9 is about 7.6 Shore D units harder than the cover of Design 1. As can be seen in FIG. 3, wedge backspin is significantly decreased compared with Design 1. Therefore, Comp9 is also more difficult to spin off the wedge, which makes Design 1 a better choice of ball for golfers seeking assistance in short game control.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A golf ball comprising:
    an inner core layer, wherein the inner core layer comprises a first highly neutralized polymer with a first flexural modulus, a second highly neutralized polymer with a second flexural modulus, and a low flexural modulus ionomer, and wherein the inner core layer has a diameter between about 24 mm and about 30 mm;
    an outer core layer, wherein the outer core layer surrounds and encompasses the inner core layer, and wherein the outer core layer comprises a rubber composition; and
    a cover layer, wherein the cover layer surrounds and encompasses the outer core layer,
    wherein the first highly neutralized polymer is about 20 to 60 parts by weight of the inner core layer,
    wherein a ratio of the second flexural modulus to the first flexural modulus is less than about 2,
    wherein the low flexural modulus ionomer has a flexural modulus of less than about 8,000 psi,
    wherein the low flexural modulus ionomer is from about 1 to about 50 parts by weight of the inner core layer,
    wherein the inner core layer has a first surface hardness, the outer core layer has a second surface hardness, and the cover layer has a third surface hardness,
    wherein the third surface hardness is greater than the first surface hardness, and the first surface hardness is greater than the second surface hardness, wherein a first difference between the first surface hardness and the second surface hardness is greater than about 1 and less than about 8 Shore D units, and wherein a second difference between the third surface hardness and the second surface hardness is less than about 20 and greater than about 10 Shore D units.

2. The golf ball of claim 1, wherein the golf ball consists of the inner core layer, the outer core layer, and the cover layer.

3. The golf ball of claim 1, wherein the low flexural modulus ionomer is less than about 20 parts by weight of the inner core layer.

4. The golf ball of claim 1, wherein the inner core layer has a diameter of about 28 mm.

5. The golf ball of claim 1, wherein the outer core layer has a thickness of about 4 mm to about 8 mm.

6. The golf ball of claim 5, wherein the outer core layer has a thickness of about 5.5 mm.

7. The golf ball of claim 1, wherein the cover layer has a thickness of about 1.2 mm to about 2 mm.

8. The golf ball of claim 7, wherein the cover layer has a thickness of about 1.7 mm.

9. The golf ball of claim 1, wherein the cover layer comprises a blend of different grades of ionomer.

10. The golf ball of claim 9, wherein the cover layer comprises a blend of three grades of ionomer.

11. The golf ball of claim 1, wherein the first flexural modulus is about 5,000 psi.

12. The golf ball of claim 1, wherein the second flexural modulus is about 10,000 psi.

13. The golf ball of claim 1, wherein the first surface hardness is about 51 to about 52 Shore D.

14. The golf ball of claim 1, wherein the second surface hardness is about 48 Shore D.

15. The golf ball of claim 1, wherein the third surface hardness is between about 63 and about 64 Shore D.

16. The golf ball of claim 1, wherein the first difference is between about 3 and about 4 Shore D units.

17. The golf ball of claim 1, wherein the second difference is between about 15 and about 16 Shore D units.

* * * * *